United States Patent
Yang et al.

(10) Patent No.: US 8,049,742 B2
(45) Date of Patent: Nov. 1, 2011

(54) IMAGE DATA REFRESHING METHOD AND DISPLAY SYSTEM USING THE SAME

(75) Inventors: Chih-Wei Yang, Tainan County (TW); Chang-Hung Lee, Yunlin County (TW)

(73) Assignee: Qisda Corporation, Taoyuan County (TW)

( * ) Notice: Subject to any disclaimer, the term of this patent is extended or adjusted under 35 U.S.C. 154(b) by 985 days.

(21) Appl. No.: 11/779,327

(22) Filed: Jul. 18, 2007

(65) Prior Publication Data

US 2008/0018582 A1 Jan. 24, 2008

(30) Foreign Application Priority Data

Jul. 19, 2006 (TW) ................................ 95126364 A

(51) Int. Cl.
*G09G 3/36* (2006.01)
(52) U.S. Cl. ...................................... 345/204; 345/545
(58) Field of Classification Search ................... 345/98, 345/204, 545; 348/333.01; 382/100; 713/300; 386/335
See application file for complete search history.

(56) References Cited

U.S. PATENT DOCUMENTS

| 4,996,594 A | 2/1991 | Murayama |
| 6,054,980 A | 4/2000 | Eglit |
| 2006/0101293 A1* | 5/2006 | Chandley et al. ............. 713/300 |

FOREIGN PATENT DOCUMENTS

| GB | 1268899 | 3/1972 |
| JP | 2-020185 | 1/1990 |
| JP | 2-100486 | 4/1990 |

OTHER PUBLICATIONS

English language translation of abstract of JP 2-020185 (published Jan. 23, 1990).
English language translation of abstract of JP 2-100486 (published Apr. 12, 1990).

* cited by examiner

*Primary Examiner* — Quan-Zhen Wang
*Assistant Examiner* — Yuk Chow

(57) ABSTRACT

An image data refreshing method used in an image data displaying device is provided. The method includes the following procedures. First, a refreshing center of a display area is defined according to a visual focus of a present frame displayed on the display area. Next, the display area is divided into at least a first sub-display area and a second sub-display area according to the refreshing center, wherein the refreshing center is located within the first sub-display area which is surrounded by the second sub-display area. Then, the refreshing rate of image data of the first sub-display area and that of the second sub-display area are set respectively. Afterwards, the image data of the first sub-display area and that of the second sub-display area are respectively refreshed.

15 Claims, 3 Drawing Sheets

IMAGE DATA REFRESHING METHOD AND DISPLAY SYSTEM USING THE SAME

This application claims the benefit of Taiwan application Serial No. 95126364, filed Jul. 19, 2006, the subject matter of which is incorporated herein by reference.

BACKGROUND OF THE INVENTION

1. Field of the Invention

The invention relates in general to an image data refreshing method and a displaying system using the same, and more particularly to an image data refreshing method which updates a frame by subdivided areas and a displaying system using the same.

2. Description of the Related Art

Along with the advance in digital technology, a large variety of electronic apparatus which were originally connected via cable lines for data transmission are now connected through wireless network. As a result, the arrangement of the data generating end (such as a computer) and the data displaying end (such as a television, a projector, a digital Hi-Fi stereo) is made more flexible, and the transmission distance is prolonged. Furthermore, the cable line is omitted, and the mess of cable lines which affects the tidiness and esthetic arrangement of the environment is avoided.

Wireless projector is already available in the market now. The wireless projector is achieved by adding a wireless transmission module to a projector. After an image data is packaged by a computer, the packaged image data is transmitted to a wireless digital module through a wireless network protocol such as 802.11a/b/g to be converted and projected the image by the projector.

However, as the image data is transmitted through a network, a certain bandwidth is required. In a network environment where a large amount of information is needed to be transmitted, it is very likely that the delay in package transmission caused by the exhaustion of bandwidth will affect the updating speed of image data, thereby making frame response rate slow down.

SUMMARY OF THE INVENTION

The invention is directed to an image data refreshing method and a displaying system using the same. According to the image data refreshing method of the invention, when a display area is updated, the display area is divided into several sub-display areas then the sub-display area is updated respectively, wherein updating of the image data of the sub-display area within which the visual focus is located is prioritized and is in a faster rate. Even when the network is busy, the focus area of a frame still can be browsed smoothly without delay.

According to a first aspect of the present invention, an image data refreshing method used in an image data displaying device is provided. The method includes the following procedures. (a) A refreshing center of a display area is defined according to a visual focus of a present frame displayed on the display area. (b) The display area is divided into at least a first sub-display area and a second sub-display area according to the refreshing center, wherein the refreshing center is located within the first sub-display area which is surrounded by the second sub-display area. (c) The refreshing rate of image data of the first sub-display area and that of the second sub-display area are set respectively. (d) the image data of the first sub-display area and that of the second sub-display area are refreshed respectively.

According to a second aspect of the present invention, a wireless projector comprising a controlling unit, a memory unit, a transmission module and a projection unit is provided. A refreshing center on a display area is defined according to a visual focus of a present frame displayed on the display area, and the display area is divided into at least a first sub-display area and a second sub-display area according to the refreshing center, wherein the refreshing center is located within the first sub-display area which is surrounded by the second sub-display area. The refreshing rate of image data of the first sub-display area and that of the second sub-display area are set respectively, and an image data update request signal is provided to an image data source device for updating the image data according to the refreshing rate of image data of the first sub-display area and that of the second sub-display area. The memory unit is for storing the image data of the first sub-display area and that of the second sub-display area. The transmission module is for providing an image data update request signal to an image data source device and receiving an image data. The projection unit is for displaying the image data of the first sub-display area and that of the second sub-display area.

According to a third aspect of the present invention, an image data source device comprising a frame capturing unit, a frame detecting unit and a processing unit is provided. The frame capturing unit is for capturing the image data of a present frame. The frame detecting unit is for comparing the image data of a present frame displayed with a to-be-updated image data so as to generate a differential image data. The processing unit is for receiving a data updating request signal and transmitting the differential image data to an image data displaying device according to the data update request signal.

According to a fourth aspect of the present invention, an image data displaying system for displaying an image data is provided. The image data displaying system comprises an image data source device and an image data displaying device. The image data source device comprises a frame capturing unit, a frame detecting unit and a processing unit. The frame capturing unit is for capturing the image data of a present frame. The frame detecting unit is for comparing the image data of a present frame with a to-be-updated image data to generate a differential image data. The processing unit is for receiving an image data update request signal and transmitting the differential image data according to the image data update request signal. The image data displaying device comprises a controlling unit, a memory unit, a transmission module and a projection unit. The controlling unit defines a refreshing center of a display area according to a visual focus of a present frame displayed on a display area and further divides the display area into at least a first sub-display area and a second sub-display area according to the refreshing center, wherein the refreshing center is located within the first sub-display area which is surrounded by the second sub-display area. The refreshing rate of image data of the first sub-display area and that of the second sub-display area are set respectively. According to the refreshing rate of image data of the first sub-display area and that of the second sub-display area, an image data update request signal is provided to the image data source device for receiving the differential image data and updating the image data. The memory unit is for storing the image data of the first sub-display area and that of the second sub-display area. The transmission module is for providing an image data update request signal to the image data source device and receiving the differential image data. The projection unit is for displaying the image data of the first sub-display area and that of the second sub-display area.

The invention will become apparent from the following detailed description of a preferred but non-limiting embodiment. The following description is made with reference to the accompanying drawings.

DETAILED DESCRIPTION OF THE INVENTION

Figure 1:
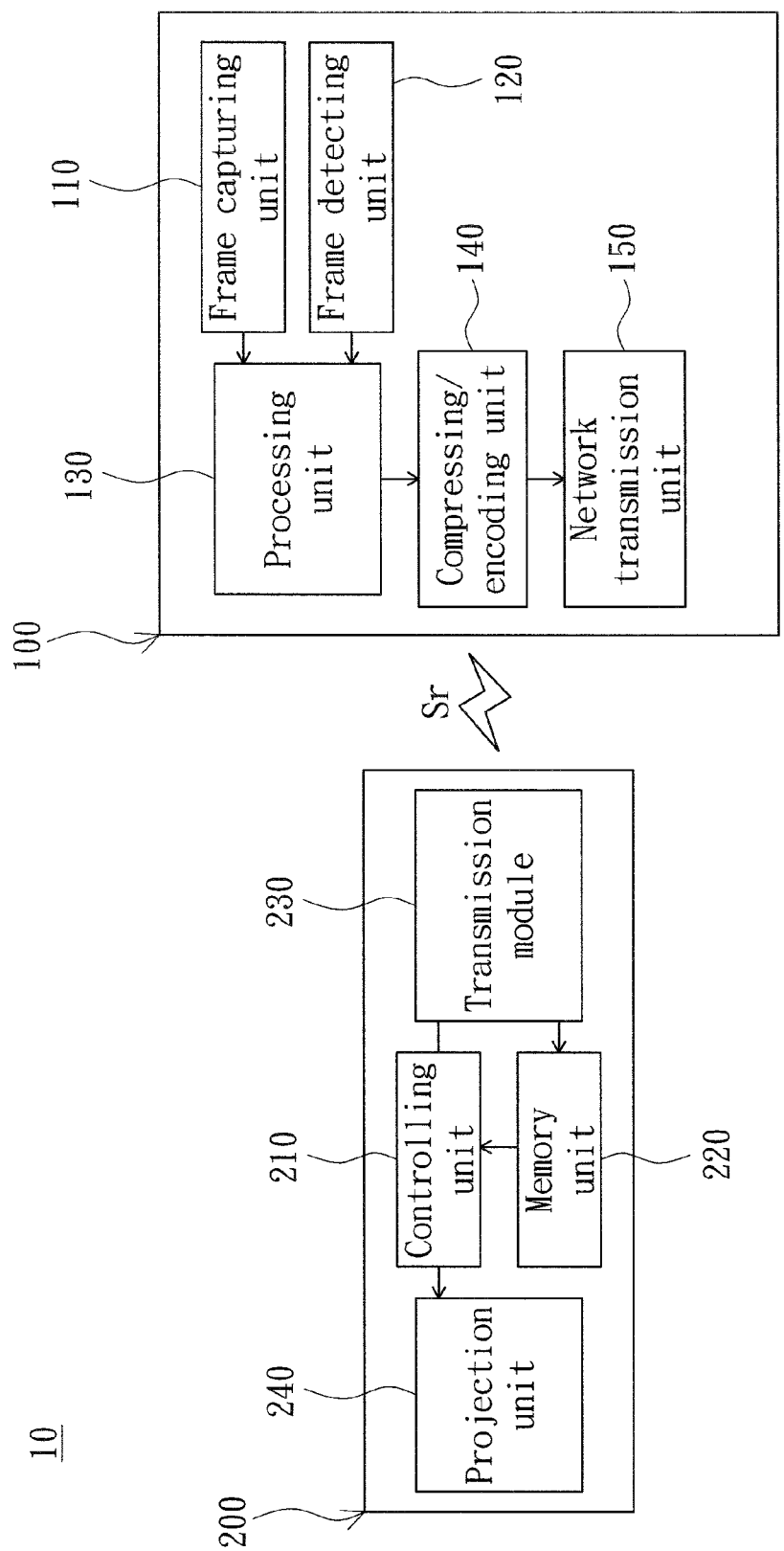
FIG. 1 is a functional block diagram of an image data displaying system according to a preferred embodiment of the invention.

Referring to FIG. 1, a functional block diagram of an image data displaying system according to a preferred embodiment of the invention is shown. The image data displaying system 10, which is used for displaying an image data, comprises an image data source device 100 and an image data displaying device 200. The image data displaying device 200 comprises a controlling unit 210, a memory unit 220, a transmission module 230, and a projection unit 240. The image data displaying device 200, which can be a projector, a television or a display device, is exemplified by a wireless projector in the present embodiment of the invention.

The controlling unit 210 defines a refreshing center of a display area according to a visual focus of a present frame displayed on a display area and further divides the display area into at least a first sub-display area and a second sub-display area according to the refreshing center, wherein the shape of the first sub-display area is a rectangle for example, and the shape of the second sub-display area is a rectangular ring for example. In the present embodiment of the invention, the refreshing center is preferably located at the cursor of the mouse, and the image data source device 100 transmits the co-ordinates of the cursor to image data displaying device 200. The refreshing center is located within the first sub-display area which is surrounded by the second sub-display area. Then, the refreshing rate of image data of the first sub-display area and that of the second sub-display area are set respectively and an image data update request signal Sr is provided to the image data source device 100 for receiving and updating an image data according to he refreshing rate of image data of the first sub-display area and that of the second sub-display area. In the present embodiment of the invention, only the part of image data of the first sub-display area and that of the second sub-display area different from image data of the original frame are updated, wherein the closer to the refreshing center the sub-display area is, the higher the refreshing rate of image data of the sub-display area will be.

The memory unit 220 for storing the image data of the first sub-display area and that of the second sub-display area can be a dynamic random access memory or a flash memory. The transmission module 230 is for providing an image data update request signal to the image data source device 100 and receiving a differential image data. The transmission module 230, which can be a cable-linked transmission module or a wireless transmission module, is exemplified by a wireless transmission module in the present embodiment of the invention. The projection unit 240 is for displaying the image data of the first sub-display area and that of the second sub-display area.

The image data source device 100 comprises a frame capturing unit 110, a frame detecting unit 120, a processing unit 130, a compressing/encoding unit 140 and a network transmission unit 150. In the present embodiment of the invention, the image data source device 100 can be a computer; the frame capturing unit 110, the frame detecting unit 120, the compressing/encoding unit 140 can be an application program, a built-in program of an operating system, or a program programmed in a chip. The processing unit 130 can be a central processing unit of a computer for example.

The frame capturing unit 110 is for capturing the image data of a present frame, for example, capturing an image data from a memory of a computer. The frame detecting unit 120 is for comparing the image data of a present frame with a to-be-updated image data to generate a differential image data. The frame detecting unit 120 further stores a frame updating rule which records the transmission sequence of the differential image data. For examples, the image data of the sub-display area closer to the refreshing center is prioritized and transmitted first.

The processing unit 130 is for receiving an image data update request signal transmitted from the image data displaying device 200 and transmitting the differential image data to the image data displaying device 200 according to the image data update request signal. The compressing/encoding unit 140 is for compressing/encoding the differential image data to reduce the volume of data transmission. The network transmission unit 150, which corresponds to a transmission module 230 of the image data displaying device 200, is used for transmitting the differential image data to the image data displaying device 200 through a network. In the present embodiment of the invention, the network transmission unit 150, which can be a wireless network transmission unit, is exemplified by a wireless network card.

Figure 2:
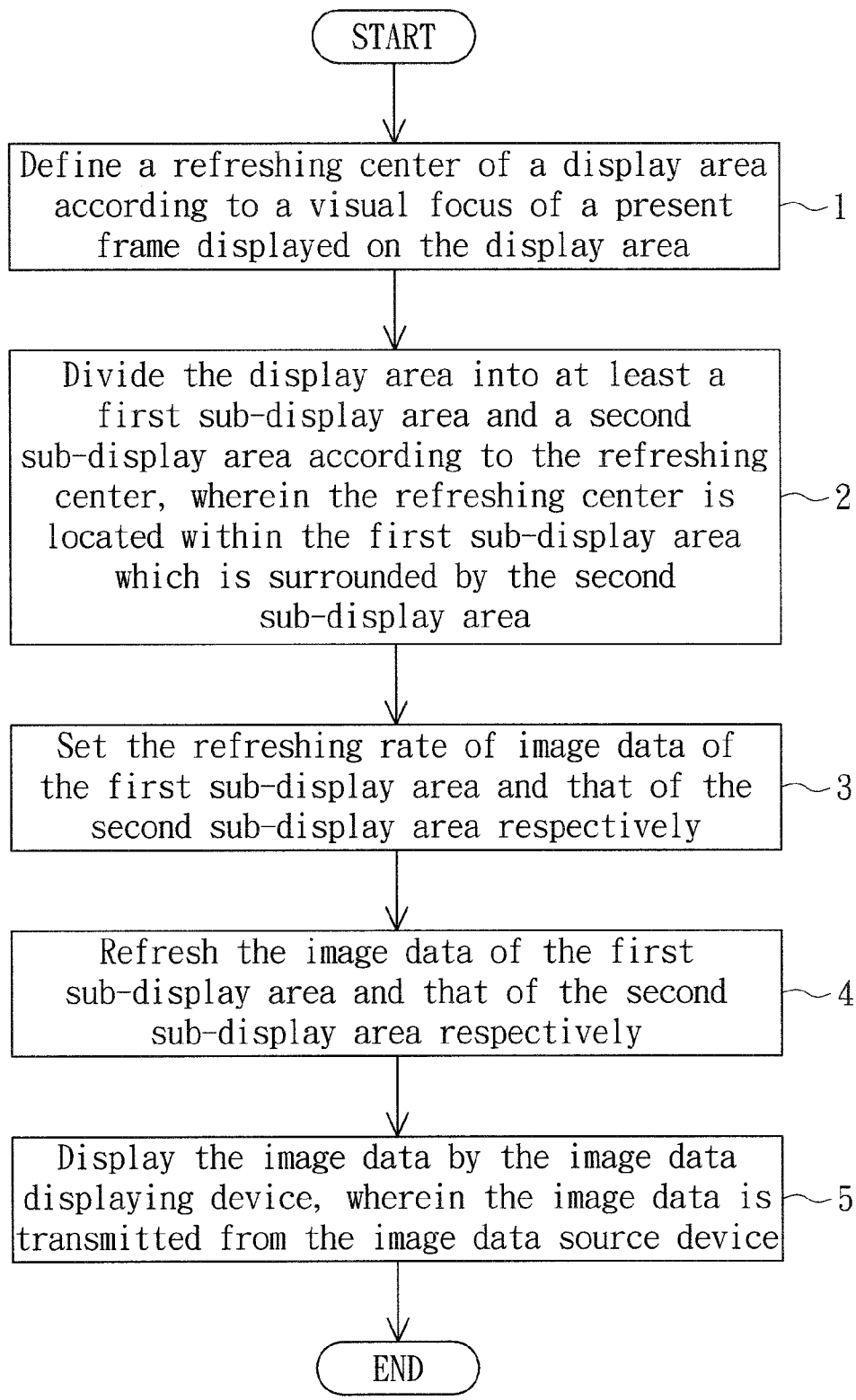
FIG. 2 is a flowchart of an image updating method of the invention.
Figure 3:
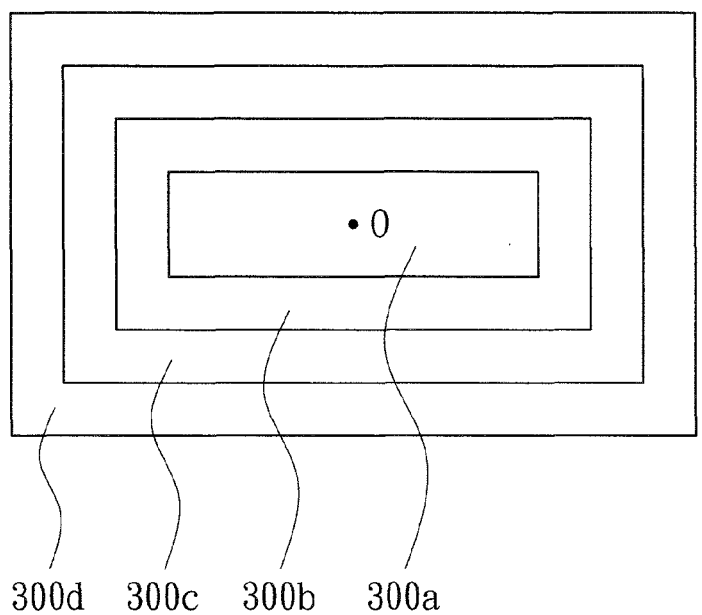
FIG. 3 is a diagram showing division of frame display area of the invention.

Referring to FIG. 2, a flowchart of an image updating method of the invention is shown. Also, referring to FIG. 3, a division of frame display area of the invention is shown. First, as indicated in step 1, a refreshing center O of a display area 300 is defined according to a visual focus of a present frame displayed on a display area 300. The visual focus is located at the cursor of the mouse.

Next, as indicated in step 2, the display area 300 is divided into a sub-display area 300a, a sub-display area 300b, a sub-display area 300c and a sub-display area 300d according to the refreshing center O, wherein the refreshing center O is located within the sub-display area 300a, the sub-display area 300b surrounds the sub-display area 300a, the sub-display area 300c further surrounds the sub-display area 300b, and sub-display area 300d further surrounds the sub-display area 300c. In the present embodiment of the invention, the shape of the sub-display area 300a is a rectangle, and the shapes of the sub-display areas 300b, 300c and 300d are rectangular rings. However, the shapes of the sub-display area of the invention are not limited to a rectangle or a rectangular ring. The sub-display area can be of any geometric shape or even an irregular shape. Any design with a refreshing center located at the center of a sub-display area, which is surrounded by the remaining sub-display areas layer by layer, is within the technology of the invention. Besides, if the location of the refreshing center O changes, a new sub-display area is generated correspondingly. Despite the present embodiment of the invention is exemplified by dividing the display area into four sub-display areas, the number of sub-display areas can be increased or decreased according to actual needs without affecting the object of the invention.

Then, as indicated in step 3, the refreshing rates of image data of the sub-display area 300a, the sub-display area 300b, the sub-display area 300c, and the sub-display area 300d are set respectively, and the closer to the refreshing center O a sub-display area is, the higher the refreshing rate of image data of the sub-display area will be. For example, the image data displaying device 200 sends an image data update request signal every period of time. In response to each image data update request signal, the image data source device 100 transmits a to-be-updated image data according to the frame updating rule of the frame detecting unit 120. For example, the image data source device 100 transmits an updated image data of the sub-display area 300a in response to every image data update request signal, transmits an updated image data of the sub-display area 300b in response to every two image data update request signals, transmits an updated image data of the sub-display area 300c in response to every three image data update request signals, and transmits an updated image data of the sub-display area 300d in response to every four image data update request signals. The rules for updating the image data of each sub-display area is disclosed in the following table:

| The sequences of image data update request signals: | Sub-display areas updated by the image data source device 100: |
| --- | --- |
| No. 1 | 300a |
| No. 2 | 300a, 300b |
| No. 3 | 300a, 300c |
| No. 4 | 300a, 300b, 300d |
| No. 5 | 300a |
| No. 6 | 300a, 300b, 300c |
| No. 7 | 300a |
| No. 8 | 300a, 300b, 300d |
| No. 9 | 300a, 300c |
| No. 10 | 300a, 300b |
| No. 11 | 300a |
| No. 12 | 300a, 300b, 300c, 300d |

Next, as indicated in step 4, the image data of the sub-display area 300a, the sub-display area 300b, the sub-display area 300c, and the sub-display area 300d are respectively updated. As the image data of the sub-display areas are updated in several batches, the volume of data transmission through network in a single batch is reduced, hence saving the bandwidth. Furthermore, the method only updates the part of image data of each sub-display area different from the original frame, further reducing the volume of data transmission.

Figure 4:
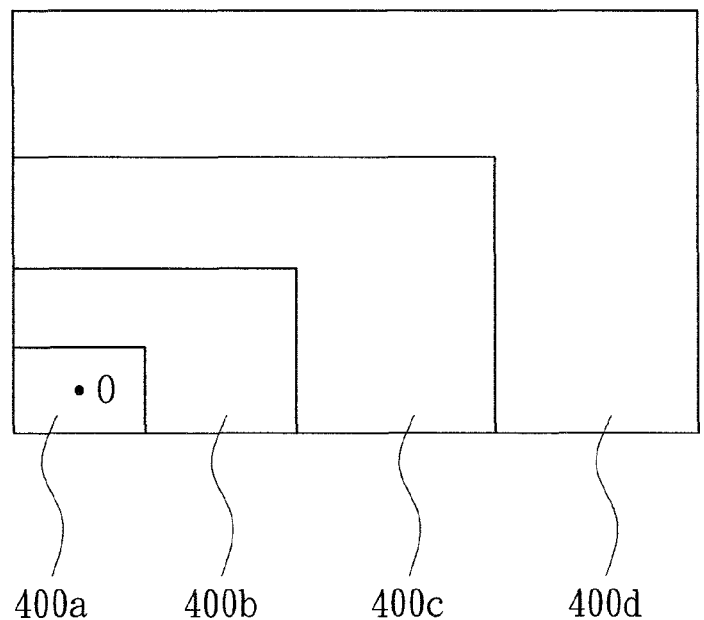
FIG. 4 is another diagram showing division of frame display area of the invention.

Moreover, as the position of the cursor of the mouse changes, the controlling unit 210 of the image data displaying device 200 generates a new sub-display area. Referring to FIG. 4, another division of frame display area of the invention is shown. When the cursor of the mouse is located at the left-lower corner of the display area 400, the controlling unit 210 divides the display area 400 into a new set of sub-display areas, namely, sub-display area 400a, sub-display area 400b, sub-display area 400c, and sub-display area 400d according to a new refreshing center O. The image data source data 100 updates the image data of the new sub-display areas. In practical application, the image data source data 100 can detect the location of the cursor of the mouse periodically so as to divide the display area into a new set of sub-display areas. If the change of position of the cursor of the mouse is not significant, the sub-display areas remain the same.

Then, as indicated in step 5, the image data transmitted from the image data source device 100 is displayed by the image data displaying device 200.

According to the image data refreshing method and the displaying system using the same disclosed in the above embodiment of the invention, the display area is divided into a number of sub-display areas, wherein a central sub-display area is surrounded by the remaining sub-display areas layer by layer, and a refreshing center is defined within the central sub-display area. The refreshing rate of image data of a sub-display area is set in a manner that the closer to the refreshing center the sub-display area is, the higher the refreshing rate of image data will be. As the image data of the sub-display areas are updated in several batches, the volume of data transmission in a single batch is reduced. Even when the bandwidth of a network is not enough, the image data of the display area within which a refreshing center defined according to a user's visual focus can be smoothly and normally updated without producing frame delay.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded to the broadest interpretation so as to encompass all such modifications and similar arrangements and procedures.

What is claimed is:

1. An image data refreshing method used in an image data display device, the method comprising:
   (a) defining a refreshing center of a display area according to a visual focus of a present frame displayed on the display area;
   (b) dividing the display area into at least a first sub-display area and a second sub-display area according to the refreshing center, wherein the refreshing center is located within the first sub-display area which is surrounded by the second sub-display area;
   (c) setting the refreshing rate of image data of the first sub-display area and that of the second sub-display area respectively; and
   (d) refreshing the image data of the first sub-display area and that of the second sub-display area respectively;
   wherein the image data of the first sub-display area and that of the second sub-display area are transmitted respectively from an image data source device to the image data display device according to the refreshing rate of the image data of the first sub-display area and that of the second sub-display area respectively; and wherein the refreshing rate of the image data of the second sub-display area is lower than the refreshing rate of the image data of the first sub-display area; and the image data source device sends fewer amount of data bits for the second sub-display area by skipping at least a portion of the image data of the second sub-display area in at least one frame.

2. The image data refreshing method according to claim 1, wherein the shapes of the first sub-display area and the second sub-display area are a rectangle or a rectangular ring respectively.

3. The image data refreshing method according to claim 1, wherein the refreshing center is substantially located at a cursor of a mouse, wherein the closer to the refreshing center the sub-display is, the higher the refreshing rate of image data of the sub-display area will be.

4. A projector, comprising:
   a controlling unit for setting a refreshing center of a display area according to a visual focus of a present frame displayed on the display area and dividing the display area into at least a first sub-display area and a second sub-display area according to the refreshing center, wherein the refreshing center is located within the first sub-display area which is surrounded by the second sub-display area;

a memory unit for storing image data of the first sub-display area and that of the second sub-display area;

a transmission module for providing an image data update request signal to an image data source device and receiving the image data; and a projection unit for displaying the image data of the first sub-display area and that of the second sub-display area;

wherein when the image data source device receives the image data update request signal, the image data of the first sub-display area and that of the second sub-display area are transmitted according to the refreshing rate of the image data of the first sub-display area and that of the second sub-display area respectively from the image data source device; and wherein the refreshing rate of the image data of the second sub-display area is lower than the refreshing rate of the image data of the first sub-display area; and the image data source device sends fewer amount of data bits for the second sub-display area by skipping at least a portion of the image data of the second sub-display area in at least one frame.

5. The projector according to claim 4, wherein the controlling unit is further used for setting the refreshing rate of image data of the first sub-display area and that of the second sub-display area.

6. The projector according to claim 4, wherein the image data of the first sub-display area is a differential image data generated from comparing the image data of the first sub-display area of the present frame with a to-be-updated image data of the first sub-display area, and the image data of the second sub-display area is another differential image data generated from comparing the image data of the second sub-display area of the present frame with a to-be-updated image data of the second sub-display area.

7. The projector according to claim 4, wherein the shapes of the first sub-display area and the second sub-display area are a rectangle or a rectangular ring.

8. The projector according to claim 4, wherein the visual focus is substantially located at a cursor of a mouse.

9. The projector according to claim 4, wherein the closer to the refreshing center the sub-display area is, the higher the refreshing rate of image data of the sub-display area will be.

10. An image data displaying system for displaying image data, comprising:

an image data displaying device, comprising:
a controlling unit for setting a refreshing center of a display area according to a visual focus of a present frame displayed on the display area and dividing the display area into at least a first sub-display area and a second sub-display area according to the refreshing center, wherein the refreshing center is located within the first sub-display area which is surrounded by the second sub-display area, and the controlling unit is further used for setting the refreshing rate of image data of the first sub-display area and that of the second sub-display area and provide an image data update request signal;

a memory unit for storing the image data of the first sub-display area and that of the second sub-display area;

a transmission module for providing the image data update request signal to an image data source device and receiving the image data from the image data source device; and a projection unit for displaying the image data of the first sub-display area and that of the second sub-display area; and the image data source device, comprising:
a processing unit for receiving the image data update request signal and transmitting the image data according to the image data update request signal;

wherein when the image data source device receives the image data update request signal, the image data of the first sub-display area and that of the second sub-display area are transmitted according to the refreshing rate of the image data of the first sub-display area and that of the second sub-display area respectively from the image data source device; and wherein the refreshing rate of the image data of the second sub-display area is lower than the refreshing rate of the image data of the first sub-display area; and the image data source device sends fewer amount of data bits for the second sub-display area by skipping at least a portion of the image data of the second sub-display area in at least one frame.

11. The displaying system according to claim 10, wherein the shape of the first sub-display area and that of the second sub-display area are a rectangle or a rectangular ring.

12. The displaying system according to claim 10, wherein the visual focus is substantially located at a cursor of a mouse.

13. The displaying system according to claim 10, wherein the closer to the refreshing center the sub-display area is, the higher the refreshing rate of image data will be.

14. The displaying system according to claim 10, wherein the image data source device further comprises a frame capturing unit for capturing the image data of the present frame; and a frame detecting unit for comparing the image data of the frame currently displayed with a to-be-updated image data so as to generate a differential image data;

wherein when the image data source device receives the image data update request signal, the differential image data of the first sub-display area and that of the second sub-display area are transmitted according to the refreshing rate of the image data of the first sub-display area and that of the second sub-display area respectively from the image data source device.

15. The displaying system according to claim 14, wherein the frame detecting unit further stores a frame updating rule which records the transmission sequence of the differential image data of the first sub-display area and that of the second sub-display area; and a compressing/encoding unit for compressing/encoding the differential image data.

* * * * *